March 30, 1948.    R. F. FOWLER    2,438,659
DEVICE FOR HOLDING ARTICLES IN ROOFS OF AUTOMOBILES
Filed May 29, 1946
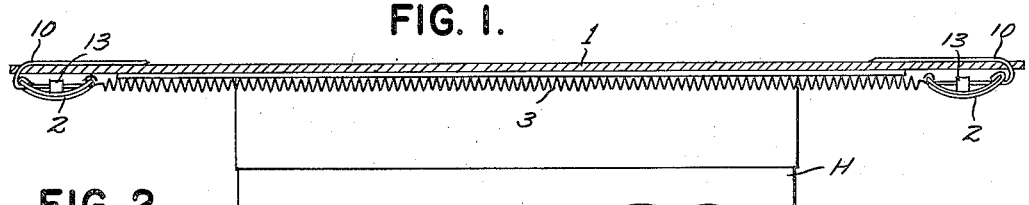
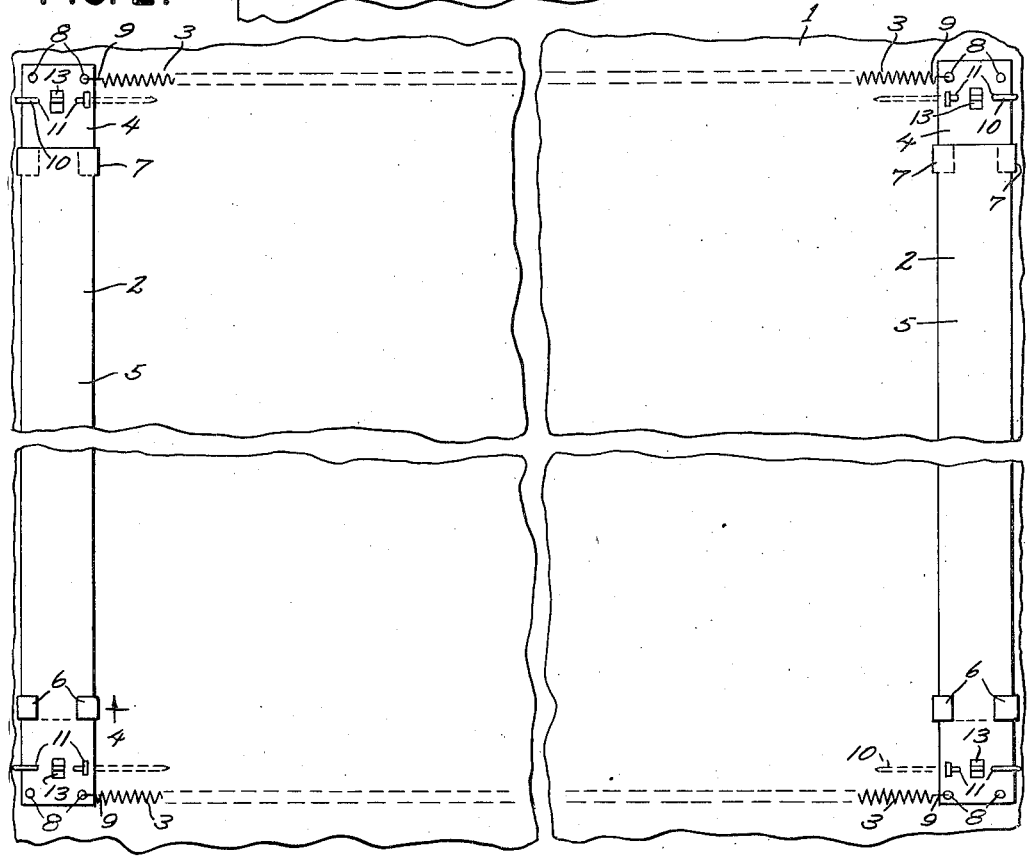
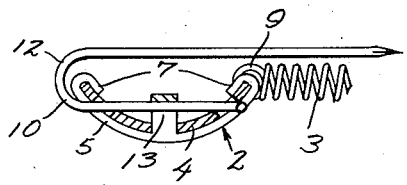
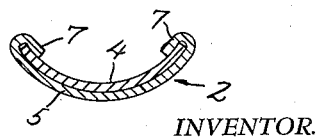
INVENTOR.
RAYMOND F. FOWLER,
BY *Victor J. Evans & Co.*
ATTORNEYS Patented Mar. 30, 1948

2,438,659

UNITED STATES PATENT OFFICE 2,438,659

DEVICE FOR HOLDING ARTICLES IN ROOFS OF AUTOMOBILES

Raymond F. Fowler, Colorado Springs, Colo.

Application May 29, 1946, Serial No. 673,115

5 Claims. (Cl. 211—31)

1

This invention relates to a hat holder for vehicles such as automobiles, it being one object of the invention to provide a hat holder which may be applied to the inner lining of the top of an automobile, and serve very effectively to hold a hat against the top of the automobile where it will be out of the way, and not become crushed or otherwise damaged.

Another object of the invention is to provide a hat holder having front and rear bars secured to the lining of the top of an automobile by pins carried by the bars, said bars being connected by springs which serve to exert pull upon the bars and hold the pins through the lining, and also serve as resilient members under which the brim of a hat is thrust so that the springs engage across the hat brim and hold the hat firmly against the lining of the car.

Another object of the invention is to provide a hat holder having end bars which are extensible longitudinally in order to accommodate them to hats of different sizes.

Another object of the invention is to provide end bars which are arcuate in cross section, and thus provided with side edges which have a tendency to grip the lining for the top of an automobile and brace the bars when the bars are subjected to pull by springs connecting ends of the bars.

Another object of the invention is to provide the bars with securing pins so mounted that they cannot move out of a position in which they extend transversely of the bars with their pointed ends projecting from inner side edges of the bars.

Another object of the invention is to provide a hat holder which is simple in construction, easy to apply or remove, and very efficient in operation.

The invention is illustrated in the accompanying drawings, wherein:

Figure 1 is a view showing the top lining of an automobile in section, and a hat held against the lining by a holder of the improved construction.

Figure 2 is a view looking upwardly at the top of an automobile, and showing the improved hat holder applied thereto in position for use.

Figure 3 is a fragmentary view showing one end bar in end elevation, and a spring and a pin for securing the bar to the lining of an automobile.

Figure 4 is a sectional view taken transversely through an end bar along line 4—4 of Figure 2.

This improved hat holder is used for holding a hat in an automobile, and is particularly useful as the hat is held against the lining 1 of the

2 top of the automobile where it will be out of the way, and not be liable to fall to the floor or onto seats of the car and damaged by the fall or by a person sitting upon or leaning against the hat. The lining is formed of fabric and spaced downwardly from the top of the car, which may be of any conventional construction. Referring to Figures 1 and 2, it will be seen that the hat holder has front and rear end bars 2 which are of duplicate construction and connected by helical springs 3 which constitute side members of the hat holder and may be of any length and diameter desired. Since the springs are formed from thin strands of resilient wire, they may be easily stretched, and the hat holder extended to a desired length.

The end bars are formed of thin, but stiff, sheet metal, and each consists of companion inner and outer sections 4 and 5, which are arcuate in cross section, as shown in Figures 3 and 4, so that they will be braced against transverse strains, and also provide the end bars with pronounced edges along their sides. Tongues 6 and 7 extend from opposite side edges of the sections 4 and 5, and these tongues are folded inwardly so that the tongues 7 overlap the inner concaved surface of the section 4 and the tongues 6 overlap the outer convexed surface of the section 5. The companion sections 4 and 5 are therefore held in slidable engagement with each other, and by exerting pull upon their outer ends, the end bars 2 may be longitudinally adjusted, and a hat holder of desired width produced. Openings 8 are formed at opposite sides of outer ends of the sections 4 and 5 to receive the eyes formed at ends of the springs 3, and since each bar section has its outer end formed with openings through both its outer corner portions, the end bars are interchangeable, and no particular care need be exercised in selecting end bars to be used when assembling the bars and the springs to form the hat holder.

The hat holder is to be firmly but detachably applied to the lining 1 and, in order to do so, there have been provided pins 10. These pins are of a length approximately twice the width of the end bars and each pin is disposed transversely of the outer end portion of a section 4 or 5 of an end bar. Openings 11 are formed through the outer end portion of each bar-section to receive a pin, and after a pin has been passed through a pair of openings 11, it is bent back upon itself, as shown at 12, extending across the bar section with its sharp pointed end projecting from the inner side edge of the bar 2. Tongues which extend longitudinally of the bar sections are cut from outer end portions thereof between the openings 11 and these tongues are pressed inwardly and form eyes or loops 13 through which the pins 10 pass. The heads of the pins limit their movement through the openings 11 in one direction, and since there is binding grip between the pins and the loops or tongues 13, the pins will be braced against sliding movement transversely of the bars 2, and also braced against turning movement in the openings 11.

When this improved hat holder is to be used, the sharp ends of the pins of one end bar are passed through the lining 1 of the top of the automobile, and the other end bar then grasped and pull exerted to expand the side springs, until the device has been extended as much as desired longitudinally of the automobile. The pins of the second end bar are then thrust through the lining, and pull upon the end bar relieved so that the springs may contract, and resiliency of the springs will then pull both bars toward each other, and the pins of both bars will be firmly held through the lining. The springs exert pull upon inner side edge portions of the end bars, and they will thus tend to tilt the end bars toward their inner sides and their inner side edges will be pressed against the lining and have biting engagement with the same. A hat may then be applied to the holder by exerting slight downward pull upon the springs, and slipping side portions of the brim of the hat between the springs and the lining 1. The springs will then extend along the hat brim at opposite sides of its crown, and the hat will be firmly held against the lining of the automobile top. By pulling one spring away from the other toward an edge of the hat brim and beyond the said edge, the hat will be released and may then be easily withdrawn from under the other spring when it is to be worn. If it is found that the hat is too wide to be conveniently fitted into place between the springs and the lining 1, it is merely necessary to withdraw the pins at one side from the lining, widen the end bars by exerting pull to slide their companion sections longitudinally of each other, and then again press the pins through the lining. In like manner, a holder may be easily and quickly removed from the top lining of an automobile and transferred to another car.

Having thus described the invention, what is claimed is:

1. A hat holder comprising end bars, each consisting of companion sections arcuate in cross section, and disposed one upon the other longitudinally thereof, tongues extending from opposite sides of inner end portions of the said sections and holding the companion sections in engagement with each other for longitudinal sliding adjustment to regulate the width of the hat holder, helical springs extending between ends of said end bars and having eyes at their ends engaged through openings formed at sides of outer ends of the said sections, said springs constituting resilient hat-engaging side members for the holder, each of said sections having its outer end portion formed with openings in inner and outer side edge portions, and between the same, being formed with longitudinally extending tongues pressed inwardly and forming loops, and pins passed through the last mentioned openings and through the loops transversely of the end bars and having portions at outer sides of the bars bent back upon themselves and across under faces of the end bars with pointed end portions projecting from inner side edges of the side bars adapted to pass through a lining of a vehicle top and mount the hat holder against the lining.

2. A hat holder comprising end bars each formed of companion strips arcuate in cross section, and having their inner end portions provided with side tongues holding the strips together and permitting longitudinal sliding adjustment of the strips, helical springs extending between ends of said end bars and connected with outer ends of their strips, said strips having their outer ends formed with transversely spaced openings and between their openings being cut to form tongues bent inwardly to form loops extending longitudinally of the strips, and pins passed through the openings and the loops and having portions projecting from outer side edges of the strips and bent back upon themselves across inner faces of the strips with their sharpened ends projecting from inner side edges of the strips.

3. A hat holder comprising end bars each formed of companion strips arcuate in cross section and having means to slidably hold the strips in engagement with each other for longitudinal adjustment, helical springs extending between said bars and having their ends connected with outer ends of said strips, outer ends of the strips being formed with openings and with loops, and pins passed through the openings and the loops transversely of the strips and having portions projecting outwardly therefrom and bent back upon themselves across rear faces of the strips with their pointed ends projecting from inner side edges of the strips.

4. A hat holder comprising end bars each formed of companion strips arcuate in cross section and having means to slidably hold the strips in engagement with each other for longitudinal adjustment, helical springs extending between said bars and having their ends connected with outer ends of said strips, and pins passed through outer ends of said strips transversely thereof and bent back across inner faces of the strips with their pointed ends projecting from inner side edges of the strips.

5. A hat holder comprising end bars each formed of companion strips arcuate in cross-section and having means to slidably hold the strips in engagement with each other for longitudinal adjustment, helical springs extending between said bars and having their ends connected with outer ends of said strips, outer ends of the strips being formed with openings and with loops and pins passed through the openings and the loops transversely of the strips and having portions projecting outwardly therefrom and bent back upon themselves across rear faces of the strips with their pointed ends projecting from inner side edges of the strips.

RAYMOND F. FOWLER.

REFERENCES CITED

The following references are of record in the file of this patent:

UNITED STATES PATENTS

| Number | Name | Date |
| --- | --- | --- |
| 1,424,833 | Leonard | Aug. 8, 1922 |
| 1,496,715 | Leiker | June 3, 1924 |
| 1,503,298 | Campbell | July 29, 1924 |
| 2,253,423 | Fellers et al. | Aug. 19, 1941 |
| 2,295,707 | Beeman et al. | Sept. 15, 1942 |
| 2,319,747 | Osborne | May 18, 1943 |